United States Patent [19]

Lewis et al.

[11] Patent Number: 5,951,747
[45] Date of Patent: *Sep. 14, 1999

[54] NON-CHROMATE CORROSION INHIBITORS FOR ALUMINUM ALLOYS

[75] Inventors: Kathrine J. Lewis, Canoga Park; Jak Aklian, Hollywood, both of Calif.

[73] Assignee: Courtaulds Aerospace, Burbank, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/731,066

[22] Filed: Oct. 9, 1996

Related U.S. Application Data

[60] Provisional application No. 60/005,027, Oct. 10, 1995, and provisional application No. 60/005,028, Oct. 10, 1995.

[51] Int. Cl.$^6$ ............................ C09D 5/08; C08L 75/00
[52] U.S. Cl. ........................ 106/14.44; 106/14.11; 106/14.12; 106/14.15; 106/14.16; 106/14.17; 106/14.34; 106/14.37; 106/14.41; 106/14.42; 524/401; 524/405; 524/414
[58] Field of Search ................ 106/14.11, 14.12, 106/14.15, 14.16, 14.34, 14.37, 14.41, 17.42, 14.44, 14.17; 524/401, 405, 414

[56] References Cited

U.S. PATENT DOCUMENTS

| | | | |
|---|---|---|---|
| 1,927,842 | 1/1933 | McDermott | 568/701 |
| 2,147,395 | 2/1939 | Bayes | 252/72 |
| 2,147,409 | 2/1939 | Lamprey | 252/72 |
| 2,624,708 | 1/1953 | Langer et al. | 508/276 |
| 3,732,115 | 5/1973 | Lankard et al. | 106/19 |
| 3,846,148 | 11/1974 | Nordyke et al. | 106/462 |
| 3,852,087 | 12/1974 | Nordyke et al. | 106/287.17 |
| 3,964,936 | 6/1976 | Das | 148/273 |
| 4,037,019 | 7/1977 | Steger | 428/469 |
| 4,110,129 | 8/1978 | Matsushima et al. | 148/6.15 |
| 4,145,462 | 3/1979 | Kuwabara et al. | 427/160 |
| 4,148,670 | 4/1979 | Kelly | 148/247 |
| 4,174,980 | 11/1979 | Howell et al. | 148/251 |
| 4,264,378 | 4/1981 | Oppen et al. | 148/261 |
| 4,298,404 | 11/1981 | Greene | 148/247 |
| 4,303,568 | 12/1981 | Nay et al. | 252/389.2 |
| 4,313,769 | 2/1982 | Frelin et al. | 148/249 |
| 4,324,684 | 4/1982 | Geiger et al. | 252/389 A |
| 4,338,140 | 7/1982 | Reghi | 148/247 |
| 4,370,177 | 1/1983 | Frelin et al. | 148/247 |
| 4,387,027 | 6/1983 | May et al. | 210/697 |
| 4,411,865 | 10/1983 | Geiger et al. | 422/16 |
| 4,451,304 | 5/1984 | Batiuk | 148/268 |
| 4,457,790 | 7/1984 | Lindert et al. | 148/247 |
| 4,470,853 | 9/1984 | Das et al. | 148/247 |
| 4,539,051 | 9/1985 | Hacias | 204/488 |
| 4,608,191 | 8/1986 | Wu | 252/391 |
| 4,612,049 | 9/1986 | Berner et al. | 106/14.13 |
| 4,615,918 | 10/1986 | Reichert et al. | 427/385.5 |
| 4,659,481 | 4/1987 | Chen | 210/697 |
| 4,696,763 | 9/1987 | Bentley et al. | 252/391 |
| 4,710,404 | 12/1987 | Reichert et al. | 427/386 |
| 4,740,393 | 4/1988 | Cody et al. | 427/388.1 |
| 4,812,174 | 3/1989 | Kimura | 148/251 |
| 4,921,552 | 5/1990 | Sander et al. | 148/247 |
| 4,992,116 | 2/1991 | Hallman | 148/247 |
| 5,026,440 | 6/1991 | Finnenthal et al. | 148/247 |
| 5,059,640 | 10/1991 | Hegedus et al. | 523/451 |
| 5,077,332 | 12/1991 | Blatter et al. | 524/389 |
| 5,089,064 | 2/1992 | Reghi | 148/247 |
| 5,089,551 | 2/1992 | Hegedus et al. | 524/396 |
| 5,125,989 | 6/1992 | Hallman | 148/247 |
| 5,126,074 | 6/1992 | Bittner | 252/387 |
| 5,129,967 | 7/1992 | Sander et al. | 148/247 |
| 5,135,681 | 8/1992 | Carter et al. | 252/389.62 |
| 5,135,999 | 8/1992 | Wu et al. | 526/224 |
| 5,147,472 | 9/1992 | Reichgott | 148/255 |
| 5,158,622 | 10/1992 | Reichgott et al. | 148/255 |

(List continued on next page.)

FOREIGN PATENT DOCUMENTS

| | | |
|---|---|---|
| 0296540 | 12/1988 | European Pat. Off. . |
| 0337075 | 10/1989 | European Pat. Off. . |
| 0639656 | 2/1995 | European Pat. Off. . |
| 2259920 | 3/1993 | United Kingdom . |
| 2302 092 | 8/1997 | United Kingdom ............ C09D 5/08 |

OTHER PUBLICATIONS

Clearfield, A., "Crystalline Hydrous Zirconia," Inorg. Chem., vol. 3, pp. 146–148 (1964) No month.
Mears, R.B. et al., "The Use of Inhibitors for Aluminum Chemical Equipment," Trans. Electrochem. Soc., vol. 83, pp. 403–417 (1943) No Month.
Thomas, J.F.J., "Inhibition of Corrosion of Aluminum and Other Metals in Soda Ash Solutions," Can. J. Research, vol. 21B, pp. 43–53 (1943) No month.
Robinson, E.A., "Silicates in Detergents . . . , " Soap and Sanitary Chem., vol. 28, pp. 34–36 (1952) No month.
Wilcox, G.D., "Passivation studies using group VIA anions," Br. Corros. J., vol. 22, No. 4, pp. 254–258 (1987) No month.
Wilcox, G.D. et al., "The Role of Molybdates in Corrosion Prevention," Corrosion Reviews, vol. 6, No. 4, pp. 327–365 (1986).
Holmes, H., "Hazardous Waste Compliance is (Almost) Easy," Metal Finishing, vol. 87, pp. 65–66 (1989) No month.
Albanese, J., "Regulatory Update—TCLP Rule Promulated by EPA," Plating and Surface Finishing, vol. 77, pp. 120–121, 126 (1990) No month.

(List continued on next page.)

*Primary Examiner*—Anthony Green
*Attorney, Agent, or Firm*—Gifford, Krass, Groh, Sprinkle, Anderson & Citkowski, P.C.

[57] ABSTRACT

A non-chromate, corrosion-inhibiting coating composition for metal surfaces includes at least one inhibitor selected from the group consisting of phosphates, phosphosilicates, silicates, and mixtures thereof, at least one inhibitor selected from the group consisting of titanates, zinc salts, and mixtures thereof, and a carrier for these inhibitors, the carrier capable of placing the inhibitors in proximity with the metal surface. In a preferred embodiment, the coating composition further includes a borate such as boric acid, and a succinate. A preferred phosphate includes calcium dihydrogen phosphate, and sodium titanium oxide is a preferred titanate. The zinc salt can include zinc phosphate or zinc cyanamide.

10 Claims, No Drawings

U.S. PATENT DOCUMENTS

| | | | |
|---|---|---|---|
| 5,169,458 | 12/1992 | Shulman et al. | 148/248 |
| 5,192,374 | 3/1993 | Kindler | 148/272 |
| 5,202,367 | 4/1993 | Hegedus et al. | 524/204 |
| 5,236,983 | 8/1993 | Hegedus et al. | 524/204 |
| 5,244,512 | 9/1993 | Kawasaki et al. | 148/260 |
| 5,260,357 | 11/1993 | Sachdeva | 523/414 |
| 5,262,464 | 11/1993 | Koevenig et al. | 524/413 |
| 5,290,839 | 3/1994 | Hegedus et al. | 524/210 |
| 5,298,092 | 3/1994 | Schriever | 148/275 |
| 5,308,903 | 5/1994 | Hegedus et al. | 524/204 |
| 5,314,532 | 5/1994 | Hughes et al. | 106/253 |
| 5,328,525 | 7/1994 | Musingo et al. | 148/247 |
| 5,338,347 | 8/1994 | Rohr et al. | 106/14.44 |
| 5,342,456 | 8/1994 | Dolan | 148/247 |
| 5,344,505 | 9/1994 | Ouyang et al. | 148/261 |
| 5,358,623 | 10/1994 | Bibber | 205/201 |
| 5,378,293 | 1/1995 | Schriever | 148/275 |
| 5,389,405 | 2/1995 | Purnell et al. | 427/387 |
| 5,401,333 | 3/1995 | Ouyang et al. | 148/241 |
| 5,401,337 | 3/1995 | Carlson et al. | 148/257 |
| 5,403,880 | 4/1995 | Hegedus et al. | 524/204 |
| 5,411,606 | 5/1995 | Schriever | 148/240 |
| 5,412,011 | 5/1995 | Morris et al. | 524/261 |
| 5,415,687 | 5/1995 | Schriever | 106/1.27 |

OTHER PUBLICATIONS

Carpenter, C.J., "The Air Force Hazardous Waste Minimization Program," Plating and Surface Finishing, vol. 77, pp. 35–36 (1990) No month.

Evans, A.T. et al., "The Adhesion and Corrosion of Chromate Containing Coatings on Aluminum," University of Manchester, Institute of Science and Technology, pp. 266–273 (1994) No month.

Foster, T. et al., "Development of a Chromate–Free Primer For Aluminum and Steel To Meet CGSB Specifications," Journal of Coatings Technology, vol. 63, No. 801 (1991) No month.

Keohan, F. et al., "Process Parameters for the APK–2000 Adhesive Pretreatment System," Moving Forward With 50 years of Leadership in Advanced Materials conference, vol. 39, pp. 1130–1142 (1994) No month.

Rodgers, T., "Evaluation of Chromate Conversion Coatings on Aluminum by Electrochemical Impedance Spectroscopy," 2nd AESF Analytical Methods Symposium, 8 pages (1988) No month.

Harvey, G.J., et al., Production and Performance of Prepainted 55% Al–Zn Alloy Coated Steel Sheet in Australia, International Conference on Zinc and Zinc Alloy Coated Steel Sheet– Galvatech, pp. 367–373 (1989) No month.

Charles R. Hegedus, Anthony T. Eng and Donald J. Hirst; Corrosion 92, The NACE Annual Conference and Corrosion Show; Self–Priming Topcoats for Steel Applications; (undated); Paper No. 466.

Ciba Additives Ciba–Geigy Corporation; IRGACOR 252 in Wash Primers Based on Beckopox EM 460/Mowital (Automotive Gray Primer); Jan. 1994.

S. Szklarska–Smialowska, "Inhibition of Pitting Corrosion", Ohio State University, Dept. of Materials Science & Eng. No date.

Natishan, P.M., McCafferty E. and Hubler G.K., "Surface Charge Considerations in the Pitting of Ion–Implanted Aluminum," J. Electrochem. Soc., 135, 321 (Feb. 1988).

Parks, G., "The Isoelectric Points of Solids Oxides, Solid Hydroxides, and Aqueous Hydroxo Complex Systems", Chemical Reviews, 65, 177 (1965) No month.

Cartledge, G.H., "Recent Studies of the Action of Inorganic Inhibitors", Corrosion, 18, 316t (Sep. 1962).

McCafferty, E., "A Competitive Adsorption Model for the Inhibition of Crevice Corrosion and Pitting", J. Electrochem. Soc., 137, 3731 (Dec. 1990).

Crompton, J.S., Andrews, P.R. and McAlpine, E., "Characteristics of a Conversion Coating on Aluminium", Surface and Interface Analysis, 13, 160 (1988) No month.

Hawkins, J., Thompson, G.E., Wood, G.C. and Isaacs, H.S., "A Study of the Inhibition of Pitting of Aluminum by Chromate", Proceedings of the 179th Electrochemical Society Meeting, May 1991.

Stewart, R., Oxidation Mechanisms, W.A. Benjamin, Inc., 33 (1964) No month.

Macdonald, D.D., "The Point Defect Model for the Passive State", J. Electrochem. Soc., 139, 3434 (Dec. 1992).

Sato, N., "Toward a More Fundamental Understanding of Corrosion Processes", Corrosion, 45, 355 (May 1989).

Fontana, M.G., Corrosion Engineering, McGraw–Hill, 284 (1986) No month.

Gui, J.Y., Stern, D.A., Frank, D.G., Lu, F., Zapien, D.C. and Hubbard, A.T., "Adsorption and Surface Structural Chemistry of Thiophenol, Benzyl Mercaptan, and Alkyl Mercaptans, Comparative Studies at Ag (111) and Pt (111) Electrodes by Means of Auger Spectroscopy, Low Energy Electron Diffraction, and Electrochemisty", Langmuir, 7, 955 (1991) No month.

Chakrabarty, C., Singh, M.M. and Agarwal, C.V., "1–Aryl–Substituted–3–Formamidino Thiocarbamide—An Efficient Corrosion Inhibitor for Aluminum Alloys in Nitric Acid", Corrosion Inhibition, Proceedings of the International Conference on Corrosion Inhibition, May 1983, NACE–7, , 113 (1983) No month.

Reinhard, G., Simon, P. and Rammelt, U., "Application of Corrosion Inhibitors in Water–Borne Coatings", Progress in Organic Coatings 20, 383 (1992) No month.

Agarwala, V.S., "Corrosion Inhibition by Phenanthrolines", Corrosion, 46, 376 (May 1990).

DeBerry, D.W. "Organic Inhibitors for Pitting Corrosion", Reviews on Corrosion Inhibitor Science and Technology, NACE, II–19–1 (1989) No month.

Hinton, B.R.W., "New Approaches to Corrosion Inhibition with Rare Earth Metal Salts", Reviews on Corrosion Inhibitor Science and Technology, NACE, I–11–1 (1989) No month.

Foster, T., Blenkinsop, G.N., Blattler, P. and Szandorowski, M., "Search for a Chromate–Free Wash Primer", J. Coatings Technology, 63, 91 (1991) No month.

Service Bulletin for Borogard ZB (form of zinc borate–$2ZnO\bullet 3B_2O_3\bullet 3.5H_2O$), U.S. Borax & Chemical Corp., Los Angeles, CA (1991) No month.

Service Bulletins for Busan 11M1 and Butrols 9100 & 9104 (barium metaborate, calcium metaborate and calcium pyroborate), Buckman Laboratories, Memphis, TN (1983, 1992 & 1994) No month.

Sugerman, G. and Monte, S.J., "Alkoxy Titanates and Zirconates As Corrosion Inhibitors", Modern Paints and Coatings, Jun. 1988.

Hinton, B.R.W., "Corrosion Prevention and Chromate, the End of an Era?", Metal Finishing, Sep., 55 and Oct. 15 (Sep. 1991).

Davis, G.D., Moshier, W.C., Fritz, T.L. and Cote, G.O., "Evolution of of the Chemistry of Passive Films of Sputter–Deposited, Supersaturated Al Alloys", J. Electrochem. Soc., 137, 422 (Feb. 1990).

Chao, C.Y., Lin, L.F. and Macdonald, D.D., "A Point Defect Model for Anodic Passive Films, Parts I, II and III", *J. Electrochem Soc.,* 128, 1187, 1194 (1981) and 129, 1874 (1982) No month.

Urquidi, M. and Macdonald, D.D., "Solute–Vacancy Interaction Model and the Effect of Minor Alloying Elements on the Initiation of Pitting Corrosion", *J. Electrochem. Soc.,* 132, 555 (1985) No month.

Cartledge, G.H., "Passivation and Activation of Iron in the Presence of Molybdate Ions", *Corrosion,* 24, 223 (Aug. 1968).

Kendig, M., Ryang, H.S., Liao, T., Cunningham, M. and Jeanjaquet, S., "Corrosion Induced Adhesion Loss–Low Volatile Organic Content (VOC) Coatings", *Final Report, Contract No. N00014–90–C–0110 for Office of Naval Research,* Rockwell International Science Center (Mar. 1993).

Shaw, B.A., Davis, G.D., Fritz, T.L. and Olver, K.A., "A Molybdate Treatment for Enhancing the Passivity of Aluminum in Chloride–Containing Environments", *J. Electrochem Soc.,* 137, 359 (Jan. 1990).

Mansfeld, F., Wang, Y. and Shih, H., "The Ce–Mo Process for the Development of a Stainless Aluminum", *Electrochimica Acta.,* 37, 2277 (1992) No month.

Aklian, J.H., Lewis, K.J. and Zook, J.D., "Quantitative Methods of Predicting Relative Effectiveness of Corrosion Inhibitive Coatings," 1996 No month.

Weller, W., "Aluminium als Werkstoff in der Textilveredelungsindustrie," Deut. Farber–Ztg., vol. 74, p. 27 (1938) No month.

Rohrig, H., "Angriffvermindernde Zusatze zu das Aluminium angrelfende Losungen," Aluminium, vol. 17, pp. 559–562 (1935) No month.

Bohner, V.H., "Ueber die angriffsvermindernde Wirkung von Wasserglaszussatzen zu Brom–und Chlorwasser bzw, Chlorkalk–Losungen," Aluminium, vol. 13, pp. 347–348 (1931) No month.

NON-CHROMATE CORROSION INHIBITORS FOR ALUMINUM ALLOYS

This application claims the benefit of U.S. Provisional Application Ser. Nos. 60/005,027 and 60/005,028 filed Oct. 10, 1995.

FIELD OF THE INVENTION

This invention relates generally to methods and compositions for inhibiting corrosion, and in particular, to methods and compositions for inhibiting corrosion of metals, especially aluminum and other light metal alloys used in aircraft. Most specifically, the present invention relates to a non-chromate containing, corrosion-inhibiting coating composition capable of protecting a wide variety of metal surfaces.

BACKGROUND OF THE INVENTION

The U.S. Environmental Protection Agency has identified the metal finishing industry as one of the one most significant contributors to environmental pollution in the United States and, in all likelihood, throughout the rest of the world. This is because the materials currently most used in metal finishing include chromium, cadmium, zinc, lead, copper, nickel, chromates, and many toxic or polluting volatile organics.

The aircraft industry, being one of the largest of the industrial finishers, provides an example of the environmental impact of these processes. In a 1990 report, Tinker Air Force Base (Oklahoma) reported producing and treating 1.4 million gallons of industrial waste water per day mostly from metal finishing. The principal contaminants were chromium, nickel, copper, cadmium, lead, zinc, tartrates, EDTA, phosphate, and ammonia. It is estimated that the cost of disposing of these wastes is approximately $220 per ton, which equates to several thousand dollars per day for this one site.

The chromate ion, which is an excellent corrosion inhibitor, has been one of the most widely used for almost a hundred years. It is generally used as a pigment in corrosion inhibitive paints, wash primers, sealants and caulks. It is also used in chromate conversion coatings, etching solutions, and in sealing anodized and phosphate coatings.

For the past ten years, however, chromate has been recognized as toxic and carcinogenic, and because of its health risks, has become highly regulated. With pressure for elimination being exerted by government regulations, continued use of chromate will incur ever increasing economic penalties. Hence, there is urgent need for non-toxic substitutes, both from economic and environmental standpoints.

Currently, the most widely used inhibitors for passivating aerospace aluminum alloys and other light metals are the alkaline earth and zinc salts of hexavalent chromium. They vary mostly in their degree of water solubility (in the order Mg>Ca>Sr$\geq$Zn) and to a much smaller extent in their pH (Sr$\geq$Ca>Mg). The chromate anion is the active species, reliably performing four necessary functions to be more fully described below. In addition, all of the above-described hexavalent chromium salts enhance adhesion in many paint and sealing systems.

Chromate performs four functions, thereby making it a desirable inhibitor. These functions include:

1. Rapid exit from a carrier matrix, such as paint or sealant.
2. Adsorption of the chromate anion on the bare metal or metal oxide. This alters space charge distributions at the interface, lowering the isoelectric point of the protective anodic metal oxide layer naturally forming on active metals. This repels chloride attack, and/or shifts the corrosion potential of that metal and/or its pitting potential in the noble direction.
3. Instead of oxygen reduction at cathode sites, reduction of chromium (VI) anion occurs to form an acid-insoluble ("persisting"), chromium (III) oxide layer at cathode sites. This fills oxide voids over cathode sites and blocks further corrosion reaction.
4. Buffering the pH or neutralizing increasing acidity at the metal/electrolyte interface which comes from metal oxidization in the absence of air. Increasing acidity accelerates corrosion exponentially.

In addition to these desirable inhibitive functions, chromate salts have the advantages of: (1) promoting adhesion at the metal/resin interface under a coating or sealant compound; (2) working well on a wide variety of metal and alloy substrates because they passivate both anodically and cathodically; (3) being relatively neutral in pH; and (4) being strong oxidizers only in acid conditions, and thus not destroying or strongly reacting with the resin matrix in which they are placed.

The prior art discloses a number of non-chromate species which have some inhibitive capabilities. For example, U.S. Pat. No. 5,126,074 discloses "hydrogen phosphate" anions as exhibiting corrosion inhibitive activity on aluminum. The patent further discloses the use in coatings of alkaline earth monohydrogen phosphates, together with a carbonate of the same alkaline earth metal and an additive of alkaline fluorosilicate or fluoroborate or alkali or alkaline fluoride. This combination is said to prevent filiform corrosion on aerospace aluminum alloys.

Other references cite the dihydrogen phosphate anion as adsorbing on alumina and lowering its isoelectric point (IEP) from pH=9 to pH=5. Lowering the IEP of aluminum oxide on aluminum metal has been shown to increase its resistance to pitting. Since this species also exhibits buffering capability, it performs functions 2 and 4.

U.S. Pat. No. 2,624,708 discloses carcinogenic mercaptobenzothiazole (MBT) as an inhibitor for aluminum and steel. Sulphur and mercapto groups which are "soft bases" are known to have a high affinity for noble and other bare metal ("soft acid") surfaces. They are effective inhibitor structures under acidic conditions where no oxide is present. By itself, this species performs only function 2.

U.S. Pat. Nos. 4,457,790 and 5,125,989 disclose the use of Mannich adducts of vegetable tannin or polyalkenyl phenols to "conversion coat" aluminum. A titanium ion or compound such as fluorotitanic acid, among others, is claimed as a co-reactant. U.S. Pat. No. 5,129,967 discloses minute catalytic amounts of dihydrohexafluorotitanic acid and hydrofluoric acid used with much larger amounts of dihydrohexafluorozirconic acid and polyacrylic acid. These patents refer to usages on aluminum and/or aluminum alloys.

U.S. Pat. No. 5,314,532 discloses zinc, cobalt, nickel and lead cyanamide pigments as exhibiting corrosion inhibitive effects on silver and thin mirror coatings. Bare, oxide-free copper would be expected to show adsorption characteristics somewhat analogous to silver, especially in an acidic, crevice environment. As with silver groups, the availability of electrons on the cyano group act as a "soft base" on bare metal "soft acid" surfaces, performing function 2.

The present invention provides a corrosion-inhibiting coating composition which performs many, if not all of the same functions as a chromate-containing composition, but without the need for the harmful chromate species. The problem solved by this invention is the elimination of toxic hexavalent chromium salts which are known to be human carcinogens, as corrosion inhibitors from treatment solutions, coatings, and sealants used on aluminum and other metal alloys. The present invention provides for the synergistic combinations of non-chromate inhibitors for aerospace aluminum alloys and other metal surfaces which can be incorporated into both curable and non-curing sealants and into curable primer and unicoat systems. This synergistic combination of inhibitors can also be incorporated into water-containing or water-absorbing fluids that might cause corrosion when used in the proximity of metal such as de-icing liquids and coolants. These and other advantages of the present invention will be readily apparent from the description, discussion and examples which follow.

SUMMARY OF THE INVENTION

There is disclosed herein a non-chromate, corrosion-inhibiting coating composition for metal surfaces. As used herein, "coating" is used to mean any composition which can cover a substrate, or which can place the inhibitors in proximity with a substrate. The composition comprises at least one inhibitor selected from the group consisting of phosphates, phosphosilicates, silicates, and mixtures thereof, at least one inhibitor selected from the group consisting of titanates, zinc salts, and mixtures thereof, and a carrier for these inhibitors, the carrier being capable of placing the inhibitors in proximity with the metal surface.

In particular embodiments, the coating composition of the present invention can further comprise a borate, such as boric acid, and/or a sulfur-containing succinate such as (2-benzothiazolylthio)succinic acid or amine salts thereof. A preferred phosphate is calcium dihydrogen phosphate. A preferred phosphosilicate is calcium, strontium zinc phosphosilicate. Sodium titanium oxide is a preferred titanate. Zinc phosphate and/or zinc cyanamide are the preferred zinc salts. The carrier comprises a solution or polymer matrix which adheres well to metal substrates and is capable of placing the inhibitors in close proximity with the metal surface. The coating composition of the present invention may also include ancillary ingredients such as pigments, rheological agents, and other performance additives.

DETAILED DESCRIPTION OF THE INVENTION

The present invention is directed to the synergistic combinations of two to six individual corrosion inhibitors contributing two to five separate functions to the inhibition of corrosion on metals. The coating composition is particularly well suited for protecting light metal alloys, such as the aluminum alloys used in aircraft.

In the broadest sense, the present invention comprises at least one inhibitor selected from the group consisting of phosphates, phosphosilicates, silicates, and mixtures thereof, at least one inhibitor selected from the group consisting of titanates, zinc salts, and mixtures thereof, and a carrier for the inhibitors, the carrier capable of placing the inhibitors in proximity with a metal surface. The coating composition of the present invention can further comprise a borate, such as boric acid, and/or a succinate, preferably a sulfur-containing succinate. The succinate comprises a compound selected from the group consisting of (2-benzothiazolylthio)succinic acid, the fatty amine salt of (2-benzothiazolylthio)succinic acid, and mixtures thereof. In a preferred embodiment, the inhibitors are loaded into the carrier to achieve 3–40% by volume in a dried film, more preferably 5–25% by volume in a dried film, and most preferably 10–20% by volume in a dried film.

In a preferred embodiment, the phosphate comprises a dihydrogen phosphate, most preferably a compound selected from the group consisting of calcium dihydrogen phosphate, potassium dihydrogen phosphate, ammonium dihydrogen phosphate, sodium dihydrogen phosphate and mixtures thereof. The phosphate can also comprise a pyrophosphate, preferably sodium pyrophosphate, or a monohydrogen phosphate, preferably dipotassium monohydrogen phosphate.

The phosphosilicate of the present invention preferably comprises a compound selected from the group consisting of calcium, strontium phosphosilicate, calcium, strontium, zinc phosphosilicate, and mixtures thereof. The silicate of the present invention preferably comprises an orthosilicate, most preferably tetrasodium orthosilicate.

In a preferred embodiment of the present invention, the titanate comprises a titanium oxide, more preferably sodium titanium oxide. The zinc salt preferably comprises a compound selected from the group consisting of zinc phosphate, zinc cyanamide, and mixtures thereof.

When used in the coating composition of the present invention, boric acid should be loaded into the carrier so that it occupies up to 10% by volume in a dried film, more preferably 0.3–5.0% by volume in a dried film, and most preferably 0.5–2% by volume in a dried film. Likewise, when used as an inhibitor, calcium dihydrogen phosphate can be added in an amount up to 10% by volume in a dried film, more preferably 0.3–7% by volume, and most preferably 0.5–5% by volume in a dried film. When calcium, strontium phosphosilicate or calcium, strontium, zinc phosphosilicate is used as an inhibitor, it can be added in an amount up to 25% by volume in a dried film, more preferably 0.3–10% by volume, and most preferably 1–5% by volume in a dried film. If (2-benzothiazolylthio)succinic acid or the fatty amine salt of (2-benzothiazolylthio)succinic acid is used as an inhibitor in the coating composition of the present invention, it can be loaded into the carrier in an amount up to 10% by volume in a dried film, more preferably 0.3–5% by volume, and most preferably 0.5–3% by volume in a dried film. Sodium titanium oxide can be added in an amount up to 10% by volume in a dried film, more preferably 1–10% by volume, and most preferably 3–6% by volume in a dried film. Zinc phosphate or zinc cyanamide, when used in the present invention can be added in an amount up to 15% by volume in a dried film, more preferably 1–10% by volume in a dried film, and most preferably 3–6% by volume.

The carrier of the present invention is any compound which is capable of adhesion to a metal surface, and is also capable of placing the combination of inhibitors in proximity with the metal surface. Suitable carriers include both curable and noncuring sealants, as well as curable primer and unicoat systems. The combination of inhibitors of the present invention can also be incorporated into water-containing or water-absorbing fluids that might cause corrosion when used in the proximity of metal such as de-icing liquids and coolants which are primarily comprised of glycol and water. Other carriers include, but are not limited to, aqueous solutions, amine-cured epoxy coatings, polyester and urethane coatings, sealant matrices such as those based on epoxy-cured polythioether polymers, $MnO_2$ cured polysulfide sealants, non-curing end-capped polysulfide sealants, and other carriers as are known in the art.

Additional materials can be added to the coating composition of the present invention such as pigments, rheological agents, adhesion promoters and other additives, as are known in the art. For example, an oily, hydrophobic additive can be used with some of the inhibitor combinations of the present invention to achieve more acceptable barrier performance of sealants in water. Additionally, since the inhibitor ingredients of this invention do not necessarily enhance adhesion as do oxidizing inhibitors such as chromate, a porous conversion coating or anodized layer on the substrate is required in very wet environments for good mechanical adhesion of a coating or sealant to the metal.

As has been discussed above, chromate has been identified as an excellent inhibitor because it performs the following four necessary functions:

1. Rapid polymer exit and short term metal passivation.
2. Passivation by metal surface adsorption and double layer space charge altering.
3. Forming a water insoluble passivation layer which persists or remains insoluble in neutral, alkaline and acidic environments.
4. Passivation by control of pH or neutralization of acid at the metal/electrolyte interface.

Therefore, in order to replace chromate, any combination of inhibitors must perform at least some, if not all of these functions in order to operate as a successful corrosion inhibitor. Additionally, transport of itself and other inhibitors out of a solid, e.g. polymeric, carrier matrix onto adjacent exposed bare metal areas in a moist but not liquid immersed environment is a performance parameter exhibited by one of the inhibitors (boric acid) of this invention that is not exhibited by chromate.

In general, the first and second inhibitive functions are performed by one or more moderately water-soluble, fast but reversibly adsorbing ingredients which exit readily from a coating or sealant, to give rapid, short-term passivation of a metal surface. Boric acid appears to have the predominant fast or first-response effect out of a polymer matrix, and appears to also aid in releasing other, less soluble, more permanent passivators from the polymer.

The third inhibitive function is performed by a slower responding combination of two ingredients to form a water-insoluble, acid-resistant, "persisting" passivation layer. By "persisting" is meant remaining on a metal surface that was exposed to inhibitor-containing solution after that inhibitor-containing solution is removed and replaced with a corrosive solution such as aqueous sodium chloride containing no inhibitor. This layer is believed to form on the bare metal as well as on the oxide. The combination of zinc phosphate or zinc cyanamide and (2-benzothiazolylthio)succinic acid or its fatty amine salt perform this function.

The fourth inhibitive function of these systems consists of buffering the pH, or controlling (neutralizing) the acidification of the metal-electrolyte interface environment in anaerobic or crevice conditions. Acid conditions dissolve the protective oxide and do not allow new insoluble oxide to form. In the formulations described by the present invention, dihydrogen phosphates, monohydrogen phosphates, pyrophosphate, orthosilicate, titanate, phosphosilicates and cyanamide can perform this function.

A variety of different quantitative and qualitative test methods have been employed to identify and corroborate passivation behavior on aircraft aluminum. These include:

1. Galvanic Current Measurement (on solutions, coatings and sealants)
   a. Uses a titanium cathode electrically shorted to the active metal, usually Al alloy, immersed in aqueous NaCl solution. Stainless steel, Cd plated steel and carbon composite cathodes are also used.
   b. Current between anode and cathode (Al and Ti or other, respectively) is measured at regular intervals and plotted versus time.
   c. Configuration accelerates development of acidic crevice conditions in a narrow, air-deficient gap between the parallel, spaced-off anode and cathode metals.
   d. Used to quantitatively test functions 1, 2 and/or 4.
   e. We define good performance as 2–5 times the initial (i.e., within 24 hours) galvanic current reduction compared to uninhibited systems, with no rise over time out to 5–6 weeks. (Uninhibited coating and sealant initial currents are approximately 0.5–1 microamps per square centimeter on bare 2024 alloy with a Ti cathode, with a visual rise in current of 2–5 times within 1–2 weeks. Chromate gives approximately 0.2–0.3 microamps per square centimeter initially, with no rise over time. The corresponding values are approximately 3–5 times higher for bare 7075 alloy with a Ti cathode.)
2. Electrochemical Impedance Spectroscopy (EIS) (on solutions, coatings and sealants)
   a. Uses an active metal (e.g. Al alloy) working electrode, passivated stainless steel counterelectrode, calomel reference electrode and Schiumberger potentiostat and frequency response analyzer.
   b. Run in one or more of the following configurations:
      i. Neutral or pH-adjusted, aerated NaCl solution, containing inhibitor(s).
      ii. Active working electrode covered with inhibitor-containing, bonded coating or sealant film exposed to open, aerated NaCl solution on the upper film side. Measures barrier properties or corrosive-environment-penetration resistance ($R_{pore}$) of bonded films.
      iii. Active working electrode covered with inhibitor-containing, non-bonded, "free film" of coating or sealant, exposed to open, aerated aqueous NaCl solution on the upper side. In this configuration, when the film is penetrated with liquid, the whole air-deficient electrolyte/active metal interface area is wetted and therefore known dimensionally to calculate accurate charge transfer resistances ($R_{ct}$).
   c. Used quantitatively to test functions 2,3 and/or 4.
   d. We define good electrochemical performance as $R_{ct}$'s of greater than $10^6$ ohm-square centimeters, persisting over time. We define good barrier performance as exhibiting high (greater than $10^8$ ohm-square centimeters), essentially immeasurable $R_{pore}$'s for as long as possible. We judge by making comparisons at equal film thicknesses. Low $R_{pore}$ can be compensated for to a great extent by high $R_{ct}$ as is the case with chromate.
3. Filiform Testing (on coatings only)
   a. Uses brief (usually one hour) HCl vapor exposure to initiate acidic filiform (underfilm crevice) corrosion conditions at cut edges of coatings. Subsequent 80+% humidity exposure propagates further filiform corrosion.
   b. Relative effectiveness of inhibitors are compared on the same substrates. [Differences in corrosiveness of Al substrates (various alloys, Alclad, conversion-coated) usually give more variation for a given coating than the differences between inhibitors, including none, in the same coating, on the same substrate.]

c. Use to qualitatively test function 4 and combined effects of functions 1–3.
  d. Good performance for a coating or coated system is usually defined as the development from a cut edge of filiforms no greater than 3–6 millimeters in length, with the majority less than 3 millimeters, after 1000 or more hours.

4. Salt Spray Testing (on coatings and sealants)
  a. Uses condensing corrosive (5%) salt solution to cause electrochemical activity of soluble inhibitors to be a factor, along with barrier properties, but the effects cannot be separately determined.
  b. By leaving some uncoated area exposed, ability of inhibitors to move from the resin matrix to uncovered or damaged areas and to protect them is determined.
  c. As in filiform testing, relative effectiveness of inhibitors are compared on the same substrates.
  d. Used to qualitatively test function 1 and combined effects of functions 2–4.
  e. Good performance is usually defined as no corrosion blister formation away from cut edges and minimal undercutting or corrosion blister formation at cut edges. Judgments are usually based on visual comparisons over time with uninhibited and chromate-inhibited controls.

5. pH Range Immersion Testing (on solutions only—solutions containing inhibitors, buffered from pH 3–10)
  a. Found to be a predictor of "persisting" (insoluble) passivation layer formation and of resistance to prolonged-exposure, acidic-condition crevice corrosion.
  b. Used to test function 3.
  c. We define good performance as resistance to visual corrosion on flat surfaces and cut edges of bare metal over a wide pH range for as long as possible; on more than one alloy, if possible. Judgments are based on visual comparisons over time with uninhibited and chromate inhibited controls.

In order to work at all, effective inhibitors must exhibit at least function 2, corrosion current suppression. Functions 1, 3 and 4 increase their effectiveness. In addition, whether they perform on one or both of the most common aerospace aluminum substrates (AA2024-T3 or AA7075-T6) (function 5), and whether their addition significantly lowers the water resistance/adhesion of a polymer matrix (function 6) is considered.

The following table summarizes some of the preferred inhibitor combinations, rated according to how many of the above six functions they perform. This invention, however, is not limited to the combinations below. These abbreviations have been used to identify the various inhibitors in which:

B=boric acid
  C=calcium dihydrogen phosphate
  K=dipotassium monohydrogen phosphate
  A=ammonium dihydrogen phosphate
  P=sodium pyrophosphate
  H=calcium, strontium phosphosilicate or calcium, strontium, zinc phosphosilicate
  S=tetrasodium orthosilicate
  I=(2-benzothiazolylthio)succinic acid or the fatty amine salt of (2-benzothiazolylthio)succinic acid
  N=sodium titanium oxide
  Z=zinc phosphate
  W=zinc cyanamide

PREFERRED INHIBITOR COMBINATIONS

| GOOD (1–2 functions) | | BETTER (3–4 functions) | | BEST (5 functions) | |
| --- | --- | --- | --- | --- | --- |
| Inhibitor | Function | Inhibitor | Function | Inhibitor | Function |
| CN | 2,5 | BINZ | 1,2,3,5 | BCINZ | 1,2,3,4,5 |
| KI | 2,5 | BCNZ | 1,2,4,5 | BCINW | 1,2,3,4,5 |
| PS | 2,4 | BNZ | 1,2,5 | HINZ | 2,3,4,5,6 |
|  |  | IZ | 2,3,6 | CINZ | 2,3,4,5,6 |
|  |  | INZ | 2,3,6 |  |  |
|  |  | HN | 2,5,6 | $SrCrO_4$ | 2,3,4,5,6 |
|  |  | HINS | 2,4,5 |  |  |

Functions =
1 = exposed metal passivation adjacent to polymer
2 = low galvanic current, high EIS Rct
3 = formation of "persisting layer"
4 = crevice condition low galvanic current
5 = performs on both 2024 and 7075 alloys
6 = good water swell resistance (low water solubility)

The present invention will best be illustrated by the following tables of examples. The same inhibitor abbreviations set forth above have also been used in these tables. A series of compositions were prepared and tested on several light metal alloys. The test samples were prepared according to the tables set forth below, all components being mixed together in a vessel, and the various formulations were applied to 2024 and 7075 alloy substrates. The samples were run through a series of tests to test their corrosion-inhibitive properties. These tests have already been discussed, with the results summarized above. In the examples, as in the rest of the specification and claims, all percentages are by volume in a dried film.

FORMULATIONS (as volume % of non-volatiles)

| Components | Non-curing Sealants | | Cured Sealants | | Solvent-borne Primer Coatings | | |
| --- | --- | --- | --- | --- | --- | --- | --- |
|  | HINZ | BCINZ | BCINZ | CINZ | BCINZ | BCNZ | BCINW |
| Non-curing polysulfide resin | 71.1 | 69.9 | — | — | — | — | — |
| Epoxy-cured polythioether resin | — | — | 73.7 | 73.6 | — | — | — |
| Amine-cured epoxy resin | — | — | — | — | 64.0 | 64.0 | 75.2 |
| Adhesion promoters, dispersants, flow agents | 1.0 | 1.0 | 0.2 | 0.2 | 4.0 | 4.0 | 10.1 |
| Inert fillers | 21.8 | 21.3 | 9.0 | 9.0 | 13.4 | 14.8 | 2.3 |
| H | 1.2 | — | — | — | — | — | — |
| B | — | 2.2 | 2.2 | — | 2.9 | 2.9 | 1.4 |
| C | — | 1.4 | 2.0 | 4.0 | 2.9 | 2.9 | 1.4 |
| I | 0.6 | 0.6 | 6.5 | 6.6 | 1.4 | — | 0.7 |
| N | 1.2 | 1.1 | 2.0 | 2.1 | 5.7 | 5.7 | 4.8 |
| Z | 3.1 | 2.5 | 4.4 | 4.5 | 5.7 | 5.7 | — |

-continued

| Components | BCINZ | BCINW | BCNZW | BCNZ | BCNW | CINZ |
|---|---|---|---|---|---|---|
| W | — | — | — | — | — | 4.1 |
| Solvent | (+20) | (+20) | (+10) | (+10) | (+70) | (+70) | (+320) |
| Water | — | — | — | — | — | — |

Water-borne Primer Coatings

| Components | BCINZ | BCINW | BCNZW | BCNZ | BCNW | CINZ |
|---|---|---|---|---|---|---|
| Non-curing polysulfide resin | — | — | — | — | — | — |
| Epoxy-cured polythioether resin | — | — | — | — | — | — |
| Amine-cured epoxy resin | 69.1 | 69.1 | 69.1 | 69.1 | 69.1 | 69.1 |
| Adhesion promoters, dispersants, flow agents | 1.7 | 1.7 | 1.7 | 1.7 | 1.7 | 1.7 |
| Inert fillers | 9.9 | 9.9 | 11.5 | 14.3 | 15.9 | 13.2 |
| H | — | — | — | — | — | — |
| B | 3.3 | 3.3 | 3.3 | 3.3 | 3.3 | — |
| C | 3.3 | 3.3 | 3.3 | 3.3 | 1.7 | 3.3 |
| I | 1.7 | 1.7 | — | — | — | 1.7 |
| N | 5.5 | 5.5 | 5.5 | 5.5 | 2.8 | 5.5 |
| Z | 5.5 | — | 2.8 | 2.8 | — | 5.5 |
| W | — | 5.5 | 2.8 | — | 5.5 | — |
| Solvent | (+28) | (+28) | (+28) | (+28) | (+28) | (+28) |
| Water | (+200) | (+200) | (+200) | (+200) | (+200) | (+200) |

It will be appreciated from the foregoing, that a non-chromate containing coating composition having excellent properties for inhibiting corrosion of a variety of metal surfaces may be prepared from the synergistic combination of two to six individual corrosion inhibitors contributing two to five separate functions to the inhibition of metals, such as light metal alloys. The specific components of the composition will depend upon particular applications and factors such as the metal alloy substrate, the particular polymer or solution matrix in which the inhibitors are carried, and the range of exposure conditions the material will see in its particular location (e.g. aircraft interior, exterior, fuel tank, skin coating, lap seam, etc.).

The foregoing discussion and examples are merely meant to illustrate particular embodiments of the invention, and are not meant to be limitations upon the practice thereof. It is the following claims, including all equivalents, which define the scope of the invention.

We claim:

1. A non-chromate, corrosion-inhibiting coating composition for metal surfaces, said composition containing inhibitors, said inhibitors comprising:

a synergistic amount of at least one compound selected from the group consisting of boric acid; borate dipotassium monohydrogen phosphate; calcium dihydrogen phosphate; ammonium dihydrogen phosphate; sodium dihydrogen phosphate; potassium dihydrogen phosphate; sodium pyrophosphate; calcium, strontium phosphosilicate; calcium, strontium, zinc phosphosilicate; tetrasodium orthosilicate; and mixtures thereof;

a synergistic amount of sodium titanium oxide;

a synergistic amount of at least one compound selected from the group consisting of zinc phosphate, zinc cyanamide, and mixtures thereof; and an effective film-forming amount of a carrier for said inhibitors, said carrier capable of placing said inhibitors in proximity with said metal surface.

2. The coating composition of claim 1 and further comprising a synergistic amount of at least one compound selected from the group consisting of (2-benzothiazolylthio) succinic acid, fatty amine salt of (2-benzothiazolylthio) succinic acid, and mixtures thereof.

3. The coating composition of claim 1 wherein said inhibitors comprise 3–40 percent by volume in a dried film.

4. A non-chromate, corrosion-inhibiting coating composition for metal surfaces, said composition containing inhibitors, said inhibitors comprising:

a synergistic amount of at least one compound selected from the group consisting of boric acid, borate, calcium dihydrogen phosphate, and mixtures thereof; or a synergistic amount of at least one compound selected from the group consisting of calcium, strontium phosphosilicate; calcium, strontium, zinc phosphosilicate; and mixtures thereof;

a synergistic amount of at least one compound selected from the group consisting of (2-benzothiazolylthio) succinic acid, the fatty amine salt of (2-benzothiazolylthio) succinic acid, and mixtures thereof;

a synergistic amount of sodium titanium oxide;

a synergistic amount of at least one compound selected from the group consisting of zinc phosphate, zinc cyanamide, and mixtures thereof; and an effective film-forming amount of a carrier for said inhibitors, said carrier capable of placing said inhibitors in proximity with said metal surface.

5. The coating composition of claim 4 wherein said boric acid comprises 0.3–10 percent by volume in a dried film.

6. The coating composition of claim 4 wherein said calcium dihydrogen phosphate comprises 0.3–10 percent by volume in a dried film.

7. The coating composition of claim 4 wherein said phosphosilicate comprises 0.3–25 percent by volume in a dried film.

8. The coating composition of claim 4 wherein said succinate compound comprises 0.3–10 percent by volume in a dried film.

9. The coating composition of claim 4 wherein said sodium titanium oxide comprises 1–10 percent by volume in a dried film.

10. The coating composition of claim 4 wherein said zinc phosphate and zinc cyanamide comprise 1–15 percent by volume in a dried film.

* * * * *